US010587043B2

(12) United States Patent
Hwang et al.

(10) Patent No.: US 10,587,043 B2
(45) Date of Patent: Mar. 10, 2020

(54) DETERMINATION CIRCUIT AND APPARATUS, MOBILE TRANSCEIVER, COMMUNICATION DEVICE, METHOD FOR DETERMINING, COMPUTER PROGRAM AND STORAGE TO DETERMINE A SPATIAL TRANSMISSION MODE

(71) Applicant: Intel IP Corporation, Santa Clara, CA (US)

(72) Inventors: Yeong-Sun Hwang, Oberhaching (DE); Holger Neuhaus, Munich (DE); Stefan Fechtel, Zorneding (DE); Bertram Gunzelmann, Neubiberg (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/066,343

(22) PCT Filed: May 30, 2017

(86) PCT No.: PCT/US2017/034928
§ 371 (c)(1),
(2) Date: Jun. 27, 2018

(87) PCT Pub. No.: WO2018/004918
PCT Pub. Date: Jan. 4, 2018

(65) Prior Publication Data
US 2019/0115657 A1 Apr. 18, 2019

(30) Foreign Application Priority Data
Jul. 1, 2016 (DE) .......................... 10 2016 112 128

(51) Int. Cl.
*H01Q 3/26* (2006.01)
*H04B 17/00* (2015.01)
(Continued)

(52) U.S. Cl.
CPC ........... *H01Q 3/2611* (2013.01); *H01Q 1/242* (2013.01); *H04B 1/3838* (2013.01); *H04B 7/04* (2013.01);
(Continued)

(58) Field of Classification Search
CPC .............................. H04B 1/401; H04B 7/0802
See application file for complete search history.

(56) References Cited

U.S. PATENT DOCUMENTS

2001/0039198 A1 11/2001 Onishi et al.
2004/0042427 A1* 3/2004 Hottinen .............. H04B 7/0647
370/335
(Continued)

FOREIGN PATENT DOCUMENTS

JP 2004506908 A 3/2004

*Primary Examiner* — Hsinchun Liao
(74) *Attorney, Agent, or Firm* — Kowert, Hood, Munyon, Rankin & Goetzel, P.C.

(57) ABSTRACT

Examples provide a determination circuit and apparatus, a mobile transceiver, a communication device, a method for determining, a computer program and a storage to determine a spatial transmission or reception mode. The determination circuit (10) is configured to determine a spatial transmission or reception mode for a mobile transceiver (100). The determination circuit (10) comprises at least one sensor (12) configured to sense attenuating object information, and a control module (14) configured to determine the spatial transmission or reception mode based on the sensed attenuating object information. The control module (14) is configured to control the spatial transmission or reception mode of the mobile transceiver (100).

20 Claims, 8 Drawing Sheets

(51) Int. Cl.
  *H04B 7/04* (2017.01)
  *H04B 7/06* (2006.01)
  *H01Q 1/24* (2006.01)
  *H04B 1/3827* (2015.01)
  *H04B 7/08* (2006.01)
  *H04M 1/02* (2006.01)

(52) U.S. Cl.
  CPC ......... *H04B 7/0615* (2013.01); *H04B 7/0617* (2013.01); *H04B 7/0689* (2013.01); *H04B 7/0802* (2013.01); *H04B 7/0871* (2013.01); *H04B 17/00* (2013.01); *H04M 1/0202* (2013.01)

(56) References Cited

U.S. PATENT DOCUMENTS

| | | | |
|---|---|---|---|
| 2008/0205537 A1* | 8/2008 | Kim | H04B 7/0408 375/267 |
| 2011/0250928 A1 | 10/2011 | Schlub et al. | |
| 2013/0217450 A1 | 8/2013 | Kanj et al. | |
| 2014/0242918 A1 | 8/2014 | Weissman et al. | |
| 2015/0382307 A1 | 12/2015 | Harper et al. | |

* cited by examiner

Fig. 3a
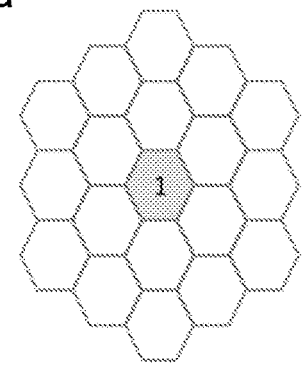
beam grid = sensor grid,
beam coverage = sensor FOV
Fig. 3b
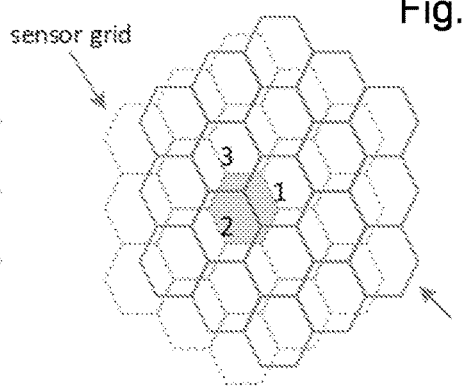
beam grid ≠ sensor grid,
beam coverage = sensor FOV
○ candidate beam direction
○ sensor FOV
● sensor FOV with a detected blocker
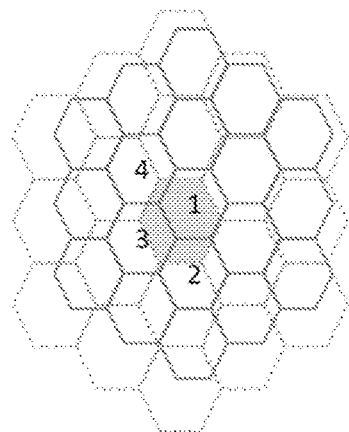
beam grid ≠ sensor grid,
beam coverage < sensor FOV
Fig. 3c
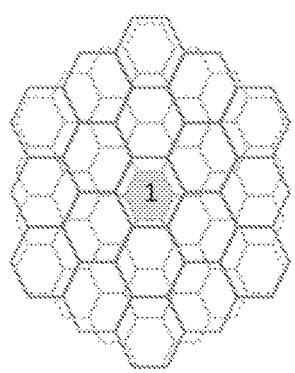
beam grid ≠ sensor grid,
beam coverage > sensor FOV
Fig. 3d blocker interpolation with
a full sensor grid blocker interpolation with
a sparse sensor grid

DETERMINATION CIRCUIT AND APPARATUS, MOBILE TRANSCEIVER, COMMUNICATION DEVICE, METHOD FOR DETERMINING, COMPUTER PROGRAM AND STORAGE TO DETERMINE A SPATIAL TRANSMISSION MODE

FIELD

Examples relate to blocker detection/determination in radio communication, in particular, but not exclusively, to spatial sensing of attenuating objects in mobile communication and to adapting beam pattern based on the spatially sensed attenuating objects.

BACKGROUND

Beamforming is a signal processing technique used to control the directionality of the transmission and reception of radio or sound signal. This is achieved via electronically or mechanically controlled directional antennas. A widely used class of electronically-controlled directional antennas is phased antenna array, whereby the signal at each array element is phase shifted so that the combined signal of an array at a particular angle is either constructively or destructively combined to induce spatial selectivity. By controlling the directional pattern of antennas, beamforming can improve signal quality at an intended receiver while reducing unintended interference to/from other directions. Thus beamforming has found numerous applications in radar, sonar, wireless communications, radio astronomy, and acoustics.

In particular, beamforming could be considered a key component of $5^{th}$-Generation (5G) wireless communication technology, whose operating bands include Extremely High Frequency (EHF), a.k.a. millimeter wave with high link attenuation characteristics. Radio wave propagation in EHF (30-300 GHz) is highly susceptible to absorption by objects (i.e. blockers) blocking the propagation paths. For instance, millimeter wave penetration into biological bodies is less than one to two millimeters, primarily due to high loss tangent of water, cf. for example, Om P. Gandhi and A. Riazzi, "Absorption of millimeter waves by human beings and its biological implications", IEEE Transactions on Microwave Theory and Techniques, vol. 34, no. 2, February 1986.

With human body, it has been shown that over 90% of the incident signal power is absorbed in the skin layer, cf for example, T. Wu, et al., "The human body and millimeter-wave wireless communication systems: Interactions and implications", IEEE International Conference on Communications (ICC), June 2015.

BRIEF DESCRIPTION OF THE FIGURES

Some examples of apparatuses, methods, and/or computer programs, etc. will be described in the following by way of example only, and with reference to the accompanying figures, in which

FIG. 3 shows relationships between a beam grid and a sensor grid in an example;

DETAILED DESCRIPTION

Figure 1:
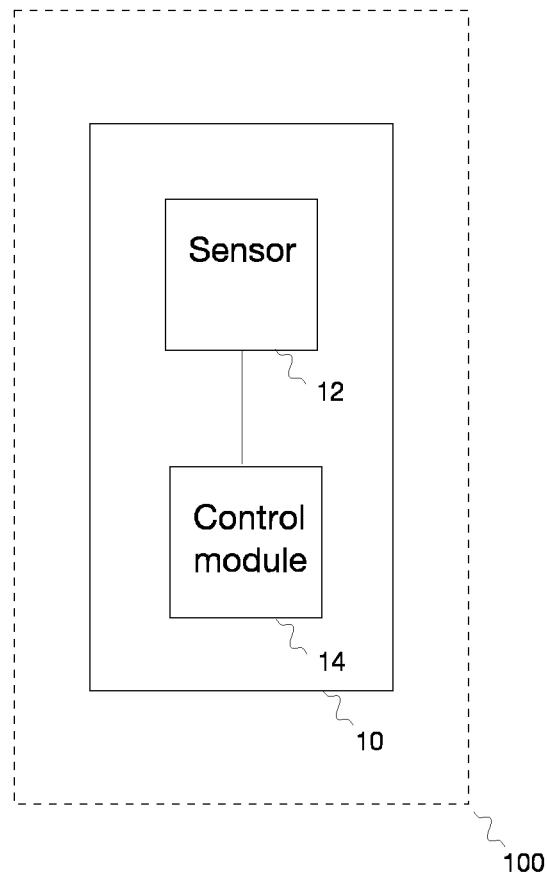
FIG. 1 illustrates an example of a determination circuit or a determination apparatus.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, unless expressly defined otherwise herein.

Examples may address the challenge of efficient and accurate selection of antenna beams or antennas at a mobile device in a wireless communication system. In particular, information from sensors embedded in mobile devices (also referred to as User Equipment (UE)) may be exploited to detect and avoid signal blockers in the context of antenna beam directions. Such blocker avoidance may improve communication quality and may help to minimize or reduce human body exposure to electromagnetic radiation.

Thus in a beamforming communication system, it is of interest to steer the beam directions away from significant blockers, including human bodies. Blocker avoidance is an inherent feature in beamforming communication systems equipped with beam training mechanisms. Such training mechanisms test sample beam directions, identify the directions with desirable qualities, e.g. high signal strength or high Signal-to-Noise Ratio (SNR), and select the beam according to the identified desirable directions. Since beam directions blocked by absorbing objects exhibit undesirable signal qualities, beam training has the effect of reducing the chance of selecting beams toward blockers.

Examples may provide a concept for blocker avoidance that exploit information from proximity or touch sensors in the communicating device to explicitly detect the presence and direction of blockers. Examples may be used as an alternative to or in conjunction with beam training methods for beam steering or antenna selection.

FIG. 1 illustrates an example of a determination/detection circuit 10 or a determination/detection apparatus 10. The determination circuit 10 is configured to determine a spatial transmission or reception mode for a mobile transceiver 100, which is indicated in FIG. 1 using broken or dashed lines as being optional in this example. The determination circuit 10 comprises at least one sensor 12 configured to sense attenuating object information. As further shown in FIG. 1 the determination circuit 10 comprises a control module 14, which is coupled to the at least one sensor 12. The control module 14 is configured to determine the spatial transmission or reception mode based on the sensed attenuating object information, and to control the spatial transmission or reception mode of the mobile transceiver 100.

In examples the control module 14 may be implemented using one or more processing units, one or more processing devices, any means for processing, such as a processor, a computer or a programmable hardware component being operable with accordingly adapted software.

In other words, the described function of the control module 14 may as well be implemented in software, which is then executed on one or more programmable hardware components. Such hardware components may comprise a general purpose processor, a Digital Signal Processor (DSP), a micro-controller, etc.

Another example is a determination apparatus 10 for determining a spatial transmission or reception mode for a mobile transceiver 100, for which the illustration of FIG. 1 fits as well. The determination apparatus 10 comprises means for sensing 12, e.g. a sensor configured to sense, attenuating object information. The apparatus 10 further comprises means for controlling 14, which is coupled to the means for sensing 12. The means for controlling 14 is configured for determining the spatial transmission or reception mode based on the sensed attenuating object information. The means for controlling 14 is configured for controlling the spatial transmission or reception mode of the mobile transceiver 100.

In the following further examples will be described and implementation details for components of the determination circuit 10 or determination apparatus 10. Such details of the determination circuit 10 may be likewise applied to the determination apparatus 10, even if explicit repetition is omitted.

In examples the transmission or reception mode of the mobile transceiver 100 may comprise different antenna selections, different beam selections, different directions of transmission or reception, different locations of transmission or reception, different spatial sub-channels, different spatial pre-coding etc. Examples may detect an attenuating object and may then adapt a transmission or reception pattern at a mobile transceiver, e.g. the location of transmission or reception may be changed by selecting one or more antennas from different locations of a mobile device 10. In some examples the control module 14 is configured to control a plurality of antennas of the mobile transceiver 100. The control module 14 may be further configured to also control a transmission power of a selected beam, antenna, pre-coding vector, transmission mode etc. In examples a transmission mode may also comprise a power setting, power configuration or power distribution (for several antennas, beams, pre-coding vectors, etc.). Examples may carry out joint power-control/precoding/beam selection/antenna selection of a multitude of transmission elements based on sensor fed information about blockers (attenuating object information).

The antennas may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field, a field array, combinations thereof, etc.

Signals transmitted to and/or received from the antennas can be phase shifted versions of each other. Depending on the geometry of the antennas, directions of constructive and destructive superposition can be generated making up the beams. For example, analog phase shifters or a Butler matrix may be used with preset or configurable phase relations to generate a grid of beams. In examples digital beamforming may be used such that the phases of the signal are manipulated digitally, e.g. in the base band. A digital beamformer may use a multiplication of complex signals with complex numbers: phase and amplitude of a signal may be varied. For example, a Discrete Fourier Transformation (DFT) may be used to form a grid to select beams from.

In examples beamforming can be used to form a grid, which may correspond to a set of beams, which may be uniform or non-uniform, the beams may differ in their shape, direction and signal strength or power. For example, a codebook comprising a number of precoding vectors may be defined and a precoding vector may generate a beam, which can have any shape. From a codebook a set of precoding vectors can be selected. The beams may differ in their directions and shapes. Such a selection or generation of beams may depend on the actual network situation, whether spatial nulling or spatial interference reduction/cancellation is applied, the characteristic of the deployment scenario, whether there is line-of-sight or non-line-of-sight propagation, how many transceivers are to be served, how many antennas elements are available, etc.

The directional pattern may be changed, e.g. by changing a beamforming mode, beamforming weight, by selecting beams or different antennas for different directions. Examples may be implemented as mobile device and may be configured for a mobile communication system. At least in some examples, the control module 14 is configured to select or determine weight information for one or more antennas from the plurality of antennas based on the sensed attenuating object information. The spatial transmission or reception mode may correspond to using the one or more selected antennas for transmission or reception. Additionally or alternatively, the control module 14 may be configured to control a plurality of antenna beams. The control module may be configured to select or determine weight information for one or more antenna beams from the plurality of antenna beams based on the sensed attenuating object information. The spatial transmission or reception mode may correspond to the one or more selected antenna beams.

Such a mobile communication system may correspond, for example, to one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WI-MAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station or base station transceiver can be operable to communicate with one or more active mobile transceivers 100 and a base station transceiver can be located in or adjacent to a coverage area of another base station transceiver, e.g. a macro cell base station transceiver or small cell base station transceiver. Hence, examples may provide a mobile communication system comprising one or more mobile transceivers 100 and one or more base station transceivers, wherein the base station transceivers may establish macro cells or small cells, as e.g. pico-, metro-, or femto cells. A mobile transceiver 100 may correspond to a smartphone, a cell phone, user equipment, a laptop, a notebook, a personal computer, a Personal Digital Assistant (PDA), a Universal Serial Bus (USB)-stick, a car, etc. A mobile transceiver 100 may also be referred to as UE or mobile in line with the 3GPP terminology.

A base station transceiver can be located in the fixed or stationary part of the network or system. A base station transceiver may correspond to a remote radio head, a transmission point, an access point, a macro cell, a small cell, a micro cell, a femto cell, a metro cell, etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point, etc., which may be further divided into a remote unit and a central unit.

Examples may use proximity and/or touch determination results from sensors in a communication device to detect blockers (attenuating objects) and their directions. For example, antennas or beam directions thereof may be selected to avoid the detected blockers.

In some examples beam training mechanisms may be used for blocker avoidance or reduction of the effects of blockers for beamforming systems, which can be aided through blocker determination. By selecting beam directions estimated to provide better signal transmission/reception quality, beam training may avoid less desirable directions that may include the ones with blockers. This indirect blocker avoidance may have a dependency on the accuracy and timeliness of beam training. In other words, how well a beam training scheme avoids blockers may depend on a periodicity (temporal density) and angular granularity (spatial density) of beam training reference signals. Such temporal and spatial density of reference signals may be sparse sub-samples of all available time and spatial resources to limit training overhead as well as to enable sufficiently fast training.

Examples using sensor-aided blocker avoidance, in contrast, may explicitly detect blockers, and may be independent of reference signal configurations. Examples may hence be used to detect blockers without warm-up time and examples may provide consistent level of accuracy regardless of any change in reference signals. When employed together with a reference-signal-based beam training scheme, the sensor-aided methods can bring two notable benefits. First, they can make the beam training more efficient by reducing the number of candidate beam directions to search over. Second, they may allow beam adaptation during the time intervals without reference signals. Another advantage of sensor-aided blocker avoidance is human exposure control. Certain sensors can be designed to specifically detect biological/human bodies, enabling priority assignment schemes to avoid the directions toward human bodies for regulatory conformance on human exposure to electromagnetic radiation, without necessarily reducing the maximum transmit power and communication quality. Some communication devices, e.g. tablets, may utilize proximity sensors to limit electromagnetic radiation. Specifically, when sensors detect human bodies nearby, the total transmit power of a device may be reduced. Examples may selectively avoid a direction of human bodies for beamformed transmission, and may reduce a radiation exposure of the human body in the same or similar way without or with less reduction of the transmit power and without or with less degradation of a communication quality. In an example, the above determination circuit 10 may comprise a plurality of sensors configured to detect information of one or more attenuating objects.

An application of a sensor-aided blocker detection/determination and avoidance example is to distribute a number of redundant antennas—or antenna modules at different places in or on the surface of a device and activate or deactivate these based on the blocker determination results. This may be especially attractive with touch sensors in some examples, whereby only those antennas facing the surfaces which are not touched by biological body parts are switched on or selected to provide (directional) antenna diversity, thus avoiding so-called "grip of death" or "antenna gate" issues. In such an example, the control module 14 may be configured to determine the transmission or reception mode to reduce a radio frequency exposure for the human body.

The spatial transmission or reception mode may be a spatial direction for transmission or reception, or one or more locations comprised in or on a mobile device comprising the mobile transceiver 100 for transmission or reception. For example, the sensor 12 may be a touch, a directional touch, proximity or a directional proximity sensor to detect a radio frequency blocker or a direction of a radio frequency blocker. In some examples, the control module 14 may be configured to carry out beamforming or beam selection based on a subset of antennas or beams determined based on the spatial transmission or reception mode.

In general, in examples the sensor may comprise at least one element of the group of an inductive sensor, a photoelectric sensor, an optical sensor, a passive infrared sensor, a capacitive sensor, a resistive sensor, and a piezoelectric sensor. Another favorable application of an example is using the antennas themselves as sensors, i.e., deriving the desired sensor information (e.g. proximity of human body) directly from observing relevant electrical parameters of antennas or antenna modules. The sensor 12 may be an antenna and the attenuating object information may be information on a reflection coefficient at the antenna or a standing wave ratio of the antenna. Examples may determine antenna matching parameters in general such as the reflection coefficient, S-parameter or Standing Wave Ratio (SWR), which may be determined along the antenna feed lines. In some examples, extra sensor hardware can be saved, and issues with sensor/antenna co-location may be avoided.

Examples may provide a mechanism for sensor-aided blocker detection/determination and avoidance methods for directional communications.

Figure 2:
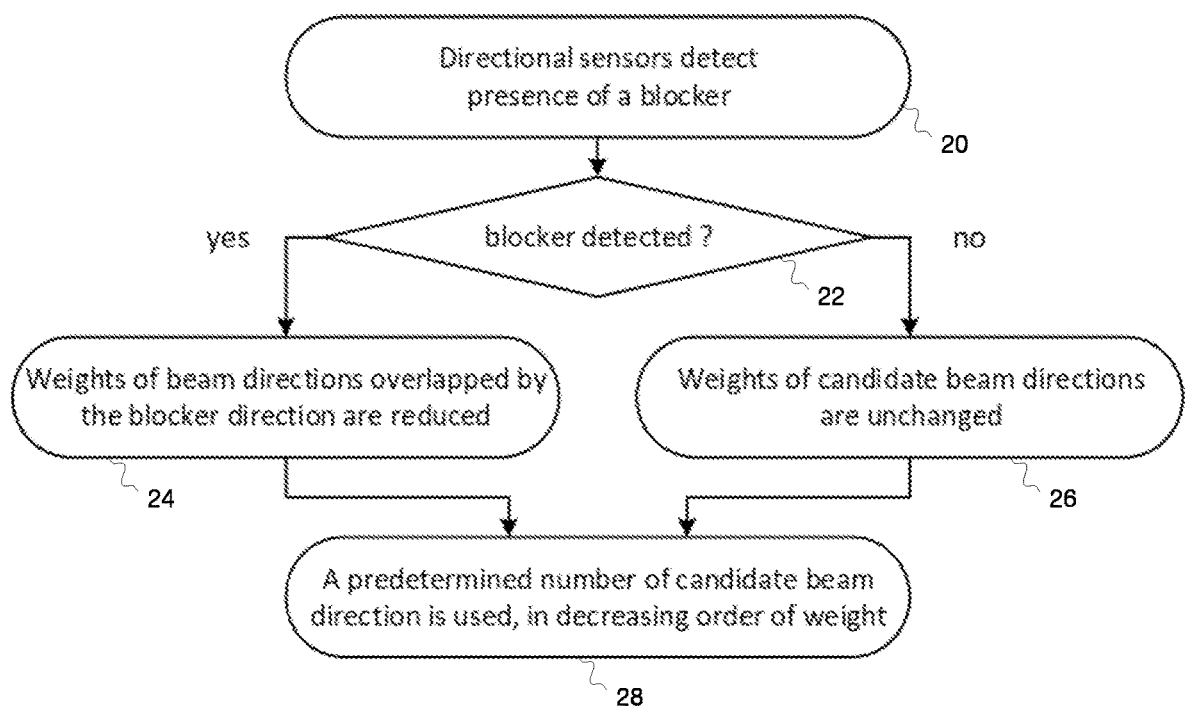
FIG. 2 shows a flow diagram of an example method for blocker determination and avoidance via beam steering.

FIG. 2 shows a flow diagram in an example. FIG. 2 illustrates a cycle of a sensor-aided blocker detection/determination and avoidance method in an example. One such cycle may be performed for each group of one or more beamforming instances. As FIG. 2 shows, a cycle starts with directional sensors detecting the presence of a blocker in step 20. The direction assigned to a sensor that detects a blocker can be considered as the blocker direction. The directionality of each sensor as well as the direction of each beam are fixed in relation to the mobile device 100 in the present example. Thus, a set of detected blocker directions can be deterministically mapped to a set of beam directions. Each candidate beam direction is assigned an associated weight, where the weight may have two or more possible values. If a sensor detects a blocker (step 22 in FIG. 2), from an initial set of candidate beam directions, the weight(s) of one or more beam directions that overlaps with the blocker direction (the direction of that sensor) may be reduced (step 24 in FIG. 2). Otherwise, if there is no blocker detected, the initial set is used as is (step 26 in FIG. 2). Finally, the set of candidate beam directions is used for beamforming, in decreasing order of weight (step 28).

The number of candidate beams used in a given beamforming instance may be predetermined based on computation resource and/or time budget, or it may be variable whereby the beams with the corresponding weights lower than a threshold may be removed from the set. A sensor 12 used for blocker detection may be a directional proximity sensor or a directional touch sensor. Proximity sensors detect the presence of nearby objects without any physical contact. There is a wide array of proximity sensor types that can detect different target materials. For example, inductive sensors target metals, photoelectric sensors can target plastics, and Passive InfraRed (PIR) sensors are suitable for biological bodies. Specifically, a PIR sensor measures infrared light radiated from objects in its field of view, and it can be tuned to human bodies by targeting the range of infrared wavelength emitted by humans.

Capacitive sensors, which are based on capacitive coupling, may also target human bodies and may be used in both proximity sensing and touch sensing. Touch sensors may detect physical contacts on a surface. In addition to several capacitive touch sensing technologies, resistive, infrared, optical, and piezoelectric sensors are available and may be used in examples.

A sensor 12 typically has an associated coverage of directions, e.g. Field Of View (FOV) and/or aperture, which is the three-dimensional angular range within which it reacts to a stimulus (a target). Sensors with narrow FOV may be more suitable for beamforming via phased antenna arrays with many elements, whereas sensors with broad FOV may be sufficient for coarser directionality control with directional patch antennas or phased arrays with a small number of elements. In examples, the determination circuit 10 may comprise a plurality of sensors generating a plurality of coverage regions. The control module 14 may be configured to determine the spatial transmission or reception mode by selecting or weighting one or more transmission or reception beams from a plurality of antenna beams. In some examples beamforming may be adaptive, and new weights may be determined in order to adapt a beam to sensed attenuating object situation. Some examples may select a beam from a predetermined set of beams or a pre-coding vector of a codebook, etc. In some examples, the control module 14 itself may be configured to control a plurality of antennas of the mobile transceiver 100 and to generate the plurality of antenna beams.

The mapping of a sensor FOV to an angular coverage of one beam, where the beam coverage may be defined, for example, by the associated 3 dB beamwidth (e.g. Half Power BeamWidth (HPBW)), may be one-to-one, one-to-many, many-to-one, or many-to-many. In general, the whole or a part of a sensor FOV may be mapped to the whole or a part of a beam coverage. If the device is designed such that the FOV of one and only one sensor can be wholly mapped to the angular coverage of one beam, then the mapping of detected blocker directions to candidate beam directions is one-to-one.

A weight assigned to a candidate beam direction may represent a priority of considering the beam direction for beamforming. While a lower weight may correspond to a lower priority, as an example, depending on implementation variants, the relationship between weight and priority may also be reversed. Blocker avoidance or impact reduction may be achieved via the set of candidate beam directions and weights used for beamforming. The set of candidate beam directions in FIG. 2 may be the whole set of all possible beam directions, a regularly sub-sampled subset of the whole set, or a reduced set of beam directions based on a previous beam training stage. The starting weights of candidate beam directions may be constant, or some weights may be reduced based on previous beam training and/or blocker avoidance cycles. At a beam training instance, where the device tests a predetermined number of beam directions to select a smaller number of preferred beams, the sequence of test beams may be in the order of decreasing weight. Thus the beam directions whose weights are sufficiently low might not be considered at all. Alternatively or in addition, the number of test beam directions may be reduced for a more efficient test, by not considering all beams whose weights are lower than certain threshold.

At beamforming instances in a time interval between beam trainings, the weights may be used to preemptively adjust the beams selected in the last beam training according to a selection metric, e.g. signal strength or SNR. A combination of this selection metric and the weight for each beam may be used to derive the beams at such beamforming instances. As an example, the selection metric multiplied by the weight may be used. Such methods provide a vehicle for a sensor-aided blocker avoidance or reduction scheme to complement and enhance a baseline beam training mechanism, where a beam may be continuously adapted even during the time period between beam training reference signals.

In examples the plurality of antennas and the plurality of coverage regions of the plurality of sensors may be mapped onto each other using different concepts. The coverage areas (of the beams and the sensors) may be arbitrary or they may be structured. In the following the coverage regions may also be referred to as grid. Such a grid may be regular or irregular depending on different factors and parameters. For example, the structure of a grid may depend on a geometry of the sensors and the antennas in or on a mobile device 100, underlying algorithms, sensor and antenna types, their position and orientation towards each other etc.

In a basic example, the plurality of antenna beams is a grid of antenna beams and the plurality of coverage regions is a grid of coverage regions. The grid of antenna beams is collocated with the grid of coverage regions.

In another example the grid of beams differs from the grid of coverage regions. The control module 14 may be configured to determine the transmission or reception mode by interpolating between coverage regions of the grid of coverage regions based on a mapping to the grid of antenna beams, or to determine the transmission or reception mode by interpolating between beams of the grid of antenna beams based on a mapping to the grid of coverage regions.

FIG. 3 shows relationships between a beam grid and a sensor grid in an example of a device. FIG. 3 illustrates four example geometries (a), (b), (c), and (d) or grid relations in examples. FIG. 3 depicts example relationships between a set of candidate beam coverages and a set of directional sensor FOVs of a mobile device 10. In FIG. 3 (a)-(d) each solid-line hexagon represents a distinct beam coverage, and a set of solid-line hexagons, called a beam grid, represents a projection of a set of possible three-dimensional beam coverages onto a two-dimensional plane. It is to be noted that this uniformity is a rather theoretical assumption and eases graphical representation of the relations. In a practical implementation the cells of a grid would have coverage regions of different numbers, shapes and sizes.

Likewise, each dashed-line hexagon represents a distinct sensor FOV, and a set of dashed-line hexagons, referred to as a sensor grid, represents a projection of a set of three-dimensional sensor FOVs onto the two-dimensional plane. A hachured hexagon represents the FOV of a sensor 12 that detected a blocker. While herein a beam coverage or a sensor FOV is represented by a hexagon for convenience, in practice its shape may be different, e.g. an ellipse or any other arbitrary shape.

Subfigure (a) corresponds to the case where the beam grid is the same as the sensor grid, in the sense that the mapping between the two grids is one-to-one. The grid of antenna beams is collocated with the grid of coverage regions.

In subfigures (b), (c), and (d), the beam grid is not the same as the sensor grid. Subfigure (b) corresponds to the case where the beamwidth of a beam is the same as a sensor FOV, subfigure (c) corresponds to the case where a beamwidth is smaller than a sensor FOV, and subfigure (d) corresponds to the case where a beamwidth is larger than a sensor FOV. Such mismatches can arise not only from a physical mismatch of the two grids but also from the combined effect of time-varying blocker directions (e.g. device rotation or moving blockers) and time-asynchrony between blocker sensing and beamforming.

The subfigures suggest that the weight reduction of a beam direction whose coverage overlaps the FOV of a blocker-detected sensor (blocker zone) may depend on how beam coverages and sensor FOVs are aligned. As subfigure (a) suggests, when the beam grid is the same as the sensor grid, a simple two-value weighting of beam directions may suffice. In the example, the beam direction 1 may be assigned a low weight, e.g. zero, so that it is effectively removed from beam training or preemptively deselected between beam trainings. In subfigures (b), (c), and (d), a sensor FOV may wholly or partially overlap with one or more beam coverages. The more overlap a beam direction has, the lower weight it is assigned. In the example of subfigure (b), beam direction 2 may be assigned a lower weight than beam directions 1 and 3. In the example of subfigure (c), the weight of beam direction 1 may be the lowest, followed by the weights of beam directions 2 and 3, with the weight of beam direction 4 reduced by the smallest amount.

In some examples the grid of beams may differ from the grid of sensor coverage regions. For example the sensor grid may be sparse, i.e. the set of sensor FOVs may not cover the entire direction range of interest, or vice versa, respectively. The control module 14 may be configured to determine the transmission or reception mode by interpolating between coverage regions of the grid of coverage regions based on a mapping to the grid of antenna beams, or the control module 14 may be configured to determine the transmission or reception mode by interpolating between beams of the grid of antenna beams based on a mapping to the grid of coverage regions.

Figure 4A:
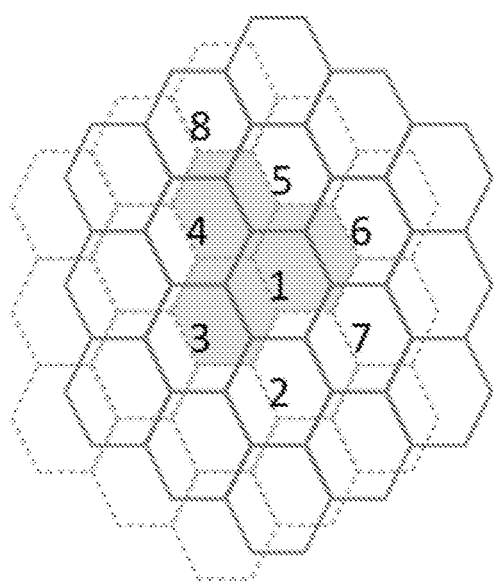
FIG. 4 illustrates blocker interpolation in an example.
Figure 4B:
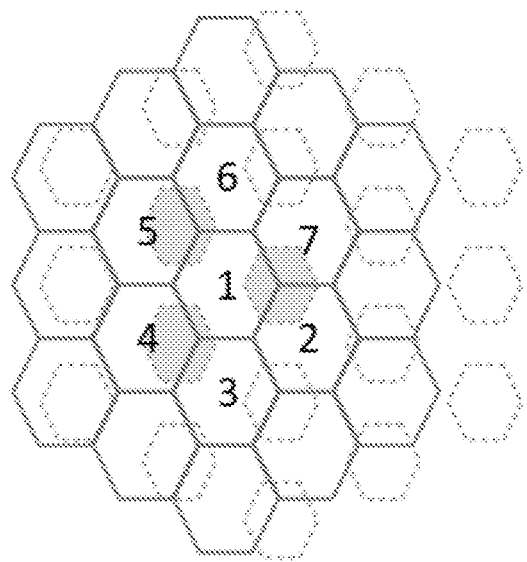

FIG. 4 illustrates blocker interpolation in an example. FIG. 4 shows two example alignments between the beam grid and sensor grid of a device, where multiple sensors detect one or more blockers. As subfigure (a) illustrates, when the sensor grid is full, i.e. does not have blind zones where it cannot detect blockers, the weight of a beam direction may be reduced in proportion to the overlap with the combined set of all blocker zones. When the sensor grid is sparse, i.e. has blind zones as in subfigure (b), two-dimensional interpolation can be used to derive the blocker-beam overlap. In this example, beam direction 1 is assigned the lowest weight, because the overlap of its beam coverage with interpolated blocker zones is the largest, even though the overlap with pre-interpolation blocker zones is relatively small.

Figure 5:
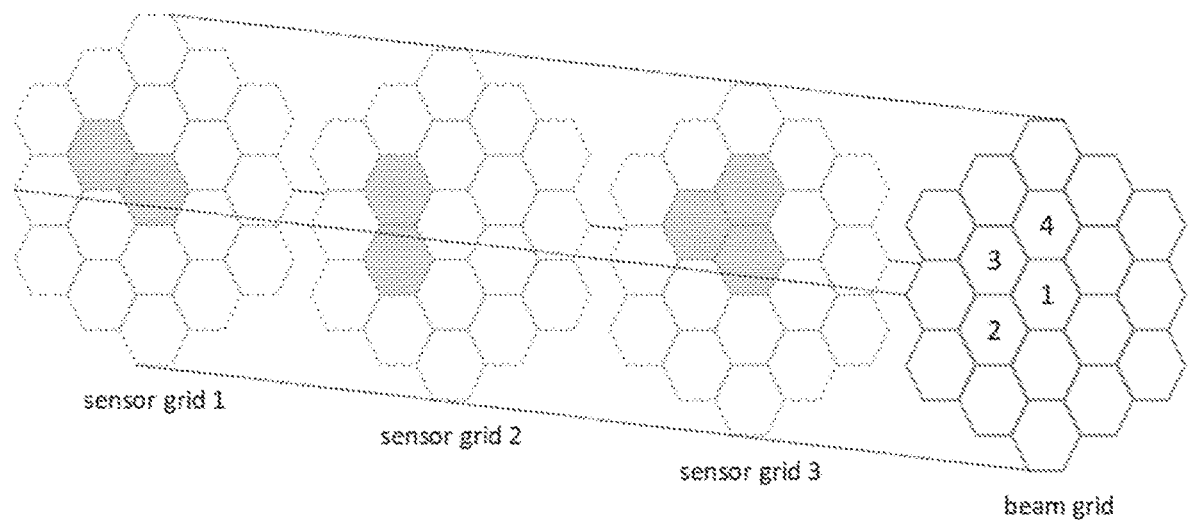
FIG. 5 shows an example with multiple sensor grids.

FIG. 5 shows an example beamforming device design that employs multiple sensor grids. There may be multiple grids of the same sensor type, or each grid may be of a different sensor type. In such cases, the weight of a beam direction may be a sum of multiple per-sensor grid weights. In such an example the control module 14 is configured to select one or more beams for transmission or reception based on a beam specific metric. The control module 14 may be configured to determine the beam specific metric for at least a subset of the grid of beams based on attenuating object information for at least a subset of the grid of coverage regions. The metric can be determined in a way that the higher a likelihood of an attenuating object being located in a beam direction the lower the likelihood for said beam to be selected for transmission or reception.

In a simple example where the mappings among the sensor grid and the beam grid are one-to-one, the weight may be inversely proportional to the number of overlapping blocker zones. In FIG. 5 beam direction 3 is assigned the lowest weight, because the corresponding sensors of all three sensor grids detected a blocker.

Figure 6:
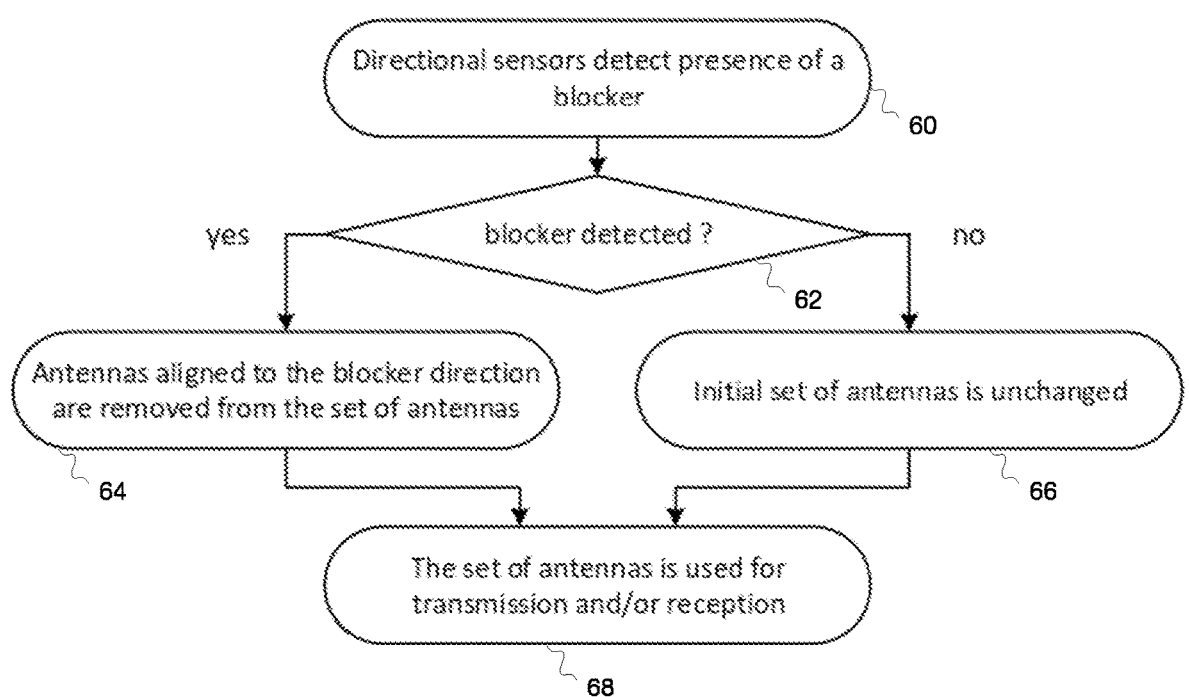
FIG. 6 shows a flow diagram of an example method for blocker determination and avoidance via antenna selection.

FIG. 6 shows a flow diagram of an example method for blocker detection and avoidance. In a first step 60 directional sensors may detect presence of a blocker. If a blocker is detected in step 62, antennas aligned to the blocker direction are removed from the set of antennas in step 64. If no blockers are detected an initial set of antennas is unchanged (step 66). The set of antennas is then used in step 68 for transmission and/or reception. FIG. 6 is a flow diagram illustrating one operation cycle of an example sensor-aided blocker detection and avoidance method. The procedure in FIG. 6 is similar to that in FIG. 2, except that a set of physical antennas is modified rather than a set of beam directions, and that the weighting is simplified to a two-value scheme so that a low weight means removal from the candidate set. The directionality of each sensor as well as the direction of each antenna are fixed in relation to the mobile device 100, i.e. a set of detected blocker directions can be deterministically mapped to a set of antennas.

This procedure may be especially suitable for devices that can support redundant antennas in different positions, whereby the set of active antennas is based on the touch detection results. For instance, each antenna may have a direction and a preference or a quality metric that is periodically updated based on a reference signal, and the initial set of antennas may comprise one antenna for each distinct group of contiguous and neighboring directions, where the member antenna has the highest metric among the antennas in the group of directions. In this scheme, touch detection may trigger the removal of a member antenna in the touched area and the substitution with a second-most preferred antenna that is not in the touched area but is in the same group of directions. Such a trigger may short-list the set of antennas for more efficient periodic updates, and it also enables antenna adaptation between the periodic updates.

Another example application is a power-saving scheme, whereby only one antenna and the associated Radio Frequency (RF) components among the antennas and RF components in a group of similar directions are activated at any given time. In this case, a quality metric for each antenna might not be available or regularly updated. Instead, antennas may be activated in a predetermined order, and the activated antennas may be changed if/when a touch is detected.

Examples may provide an apparatus and a method for determining a transmission direction and/or a reception direction for a communication at a mobile device of a radio communications network. Such method may comprise detecting, with one or more sensors, the presence and/or an attenuation strength and the direction of an object (blocker) that degrades the transmitted or received signal strength or signal quality. The method may comprise mapping, if a blocker is detected, the direction of the detected blocker to one or more transmission/reception directions. The method may comprise reducing a preference metric of each mapped direction, relative to the amount of overlap between the angular coverage of the sensor that detected a blocker and the angular coverage of the mapped beam. The method may comprise using the beam directions in the decreasing order of the associated preference metrics in determining a transmission and/or a reception direction.

In some examples the sensors for detecting a blocker are directional proximity sensors or directional touch sensors. The number of beam directions used in determining a transmission and/or a reception direction may be predetermined. In some examples only the beam direction whose preference metric exceeds a predetermined threshold are used in determining a transmission and/or a reception direction. Examples may provide an apparatus and a method for determining an antenna for a communication at a mobile device of a radio communications network. A method may comprise detecting, with one or more directional touch sensors, the presence and the location of a body surface that attenuates the transmitted or received signal strength or signal quality. The method may comprise mapping, if a touch is detected, the location of the detected touch to one or more antennas. The method may comprise de-selecting (not selecting) the mapped antennas associated with the touch location for signal transmission and/or reception.

Figure 7:
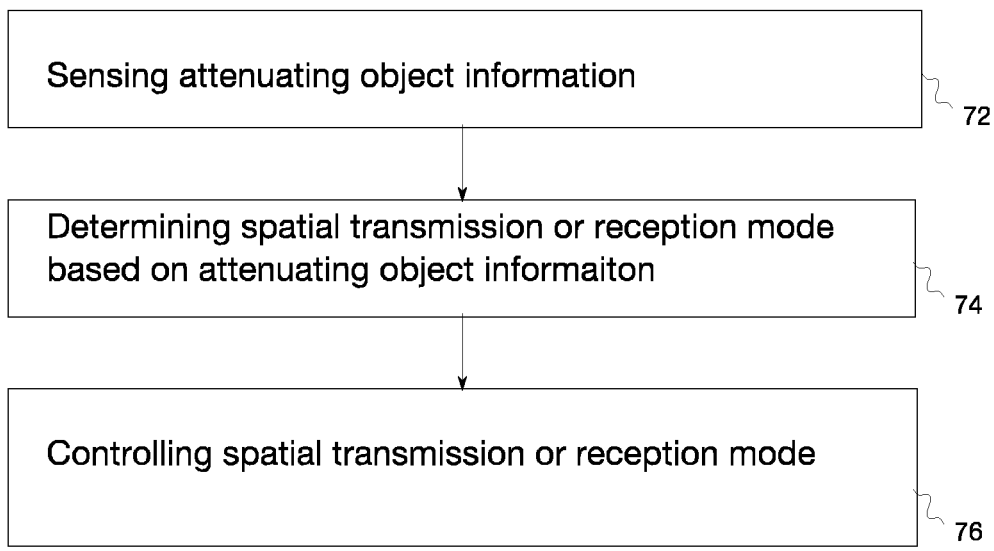
FIG. 7 shows a block diagram of an example of a method for determining an attenuating object.

FIG. 7 shows a block diagram of an example of a method for determining a spatial transmission or reception mode for a mobile transceiver. The method comprises sensing 72 attenuating object information, and determining 74 the spatial transmission or reception mode based on the sensed attenuating object information. The method comprises controlling 76 the spatial transmission or reception mode of the mobile transceiver 100.

Figure 8:
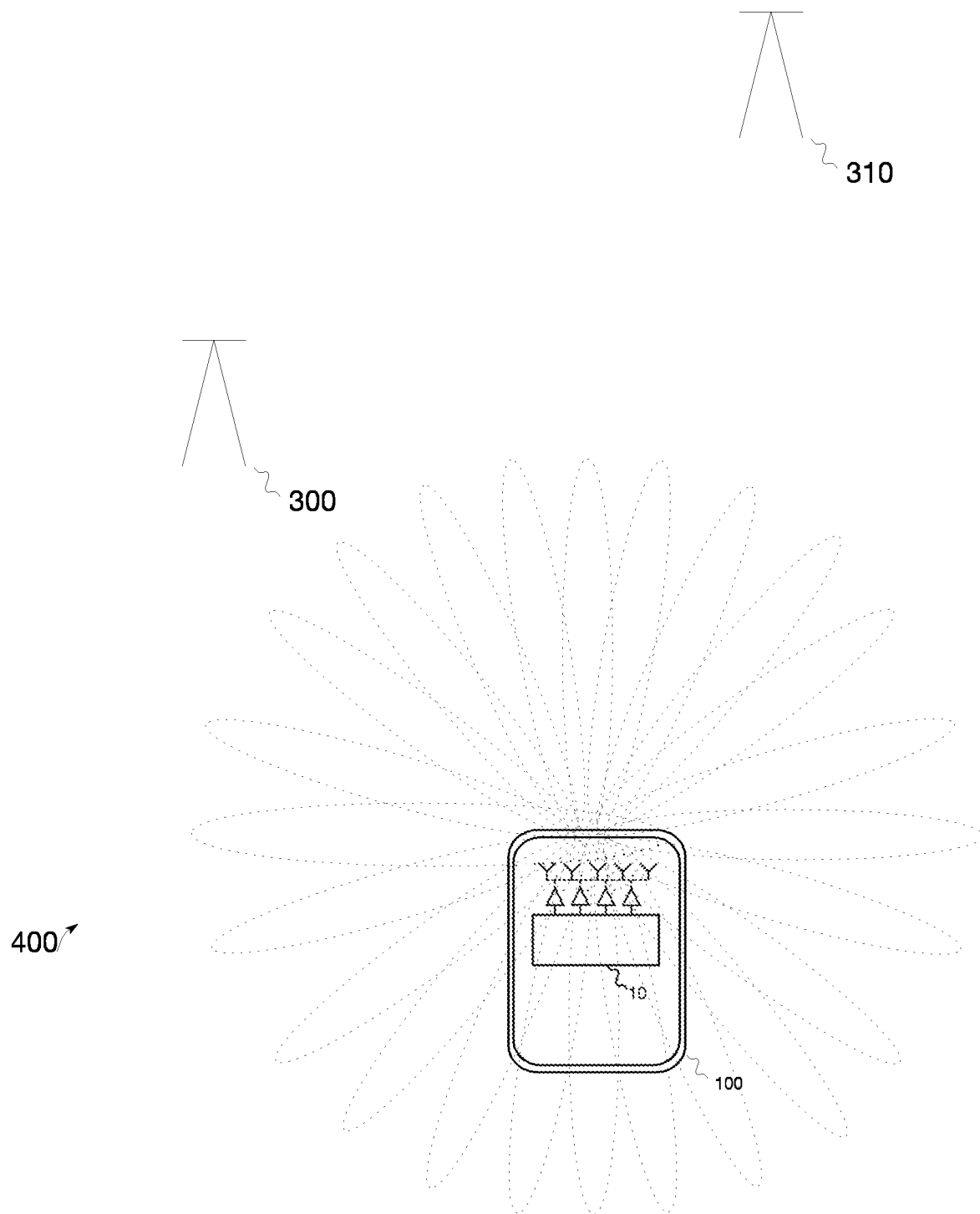
FIG. 8 shows a diagram of an example mobile device.

FIG. 8 shows a diagram of an example of a communication or mobile device 100, which comprises the above described detection/determination circuit 10 or detection/determination apparatus 10. In examples such a communication device may also comprise a transceiver configured to transmit and receive radio signals with another communication device, e.g. a base station transceiver. FIG. 8 also illustrates an example of a mobile communication system 400, e.g. an LTE, LTE-A, or 5G system. The mobile communication system 400 comprises the example of the mobile transceiver 100 potentially communicating with a number of base station transceivers 300, 310. The mobile transceiver 100 comprises a number of antennas, each potentially being connected to a transceiver with typical transceiver components, i.e. transmitter and receiver components. Examples are one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. The determination circuit 10 controls the transmission or reception mode of the mobile transceiver 100, which is indicated by the many broken line beams to select from, in case a predetermined set of beams is available, which could be adaptively formed, or which correspond to different antenna selections.

The examples as described herein may be summarized as follows:

A first example is a determination circuit 10, which is configured to determine a spatial transmission or reception mode for a mobile transceiver 100. The determination circuit 10 comprises at least one sensor 12 configured to sense attenuating object information. The determination circuit comprises a control module 14 configured to determine the spatial transmission or reception mode based on the sensed attenuating object information. The control module 14 is configured to control the spatial transmission or reception mode of the mobile transceiver 100.

In example 2 the control module 14 of any of the previous examples is configured to control a plurality of antennas of the mobile transceiver 100.

In example 3 the control module 14 of any of the previous examples is configured to select or determine weight information for one or more antennas from the plurality of antennas based on the sensed attenuating object information. The spatial transmission or reception mode corresponds to using the one or more selected antennas for transmission or reception.

In example 4 the control module 14 of any of the previous examples is configured to control a plurality of antenna beams, and the control module 14 is configured to select or determine weight information for one or more antenna beams from the plurality of antenna beams based on the sensed attenuating object information and the spatial transmission or reception mode corresponds to the one or more selected antenna beams.

In example 5 the determination circuit 10 of any of the previous examples comprises a plurality of sensors 12 configured to detect or determine information of one or more attenuating objects.

In example 6 the spatial transmission or reception mode is a spatial direction for transmission or reception, or one or more locations comprised in or on a mobile device comprising the mobile transceiver 100 for transmission or reception.

In example 7 the sensor 12 of any of the previous examples is a touch, a directional touch, a proximity or a directional proximity sensor to detect a radio frequency blocker or a direction of a radio frequency blocker.

In example 8 the control module 14 of any of the previous examples is configured to carry out beamforming or beam selection based on a subset of antennas or beams determined based on the spatial transmission or reception mode.

In example 9 the sensor 12 of any of the previous examples is configured to sense proximity or direction of a human body.

In example 10 the control module 14 of any of the previous examples is configured to determine the transmission or reception mode to reduce a radio frequency exposure radiation for the human body.

In example 11 the sensor 12 of any of the previous examples is an antenna and the attenuating object information is information on a reflection coefficient at the antenna or a standing wave ratio of the antenna.

In example 12 the sensor 12 of any of the previous examples comprises at least one element of the group of an inductive sensor, a photoelectric sensor, an optical sensor, a passive infrared sensor, a capacitive sensor, a resistive sensor, and a piezoelectric sensor.

In example 13 the determination circuit 10 of any of the previous examples comprises a plurality of sensors generating a plurality of coverage regions and the control module 14 is configured to determine the spatial transmission or reception mode by selecting or weighting one or more transmission or reception beams from a plurality of antenna beams.

In example 14 the control module 14 of any of the previous examples is configured to control a plurality of antennas of the mobile transceiver 100 and to generate the plurality of antenna beams.

In example 15 the plurality of antenna beams is a grid of antenna beams and the plurality of coverage regions is a grid of coverage regions, and the grid of antenna beams is collocated with the grid of coverage regions.

In example 16 the plurality of antenna beams is a grid of antenna beams and the plurality of coverage regions is a grid of coverage regions, the grid of beams differs from the grid of coverage regions. The control module 14 is configured to determine the transmission or reception mode by interpolating between coverage regions of the grid of coverage regions based on a mapping to the grid of antenna beams, or determine the transmission or reception mode by interpolating between beams of the grid of antenna beams based on a mapping to the grid of coverage regions.

In example 17 the control module 14 of any of the previous examples is configured to select one or more beams for transmission or reception based on a beam specific metric, and to determine the beam specific metric for at least a subset of the grid of beams based on the attenuating object information for at least a subset of the grid of coverage regions. The metric is determined in a way that the higher a likelihood of an attenuating object being located in a beam direction the lower the likelihood for said beam to be selected for transmission or reception.

Example 18 is a determination apparatus 10 for determining a spatial transmission or reception mode for a mobile transceiver 100. The determination apparatus 10 comprises means for sensing 12 attenuating object information. The apparatus 10 comprises means for controlling 14 configured for determining the spatial transmission or reception mode based on the sensed attenuating object information. The means for controlling 14 is configured for controlling the spatial transmission or reception mode of the mobile transceiver 10.

In example 19 the means for controlling 14 is configured for controlling a plurality of antennas of the mobile transceiver 100.

In example 20 the means for controlling 14 of any of the previous examples is configured for selecting or determining weight information for one or more antennas from the plurality of antennas based on the sensed attenuating object information, and the spatial transmission or reception mode corresponds to using the one or more selected antennas for transmission or reception.

In example 21 the means for controlling 14 of any of the previous examples is configured for controlling a plurality of antenna beams, and the means for controlling 14 is configured for selecting or determining weight information for one or more antenna beams from the plurality of antenna beams based on the sensed attenuating object information and the spatial transmission or reception mode corresponds to the one or more selected antenna beams.

In example 22 the determination apparatus 10 of any of the previous examples comprises a plurality of means for sensing configured for detecting information of one or more attenuating objects.

In example 23 the spatial transmission or reception mode is a spatial direction for transmission or reception, or one or more locations comprised in or on a mobile device comprising the mobile transceiver 100 for transmission or reception.

In example 24 the means for sensing 12 of any of the previous examples comprises a touch, a directional touch, a proximity or a directional proximity sensor for detecting a radio frequency blocker or a direction of a radio frequency blocker.

In example 25 the means for controlling 14 of any of the previous examples is configured for carrying out beamforming or beam selection based on a subset of antennas or beams determined based on the spatial transmission or reception mode.

In example 26 the means for sensing 12 is configured for sensing proximity or direction of a human body.

In example 27 the means for controlling 14 of any of the previous examples is configured for determining the transmission or reception mode to reduce a radio frequency exposure for the human body.

In example 28 the means for sensing 12 of any of the previous examples comprises an antenna and the attenuating object information is information on a reflection coefficient at the antenna or a standing wave ratio of the antenna.

In example 29 the means for sensing 12 of any of the previous examples comprises at least one element of the group of an inductive sensor, a photoelectric sensor, an optical sensor, a passive infrared sensor, a capacitive sensor, a resistive sensor, and a piezoelectric sensor.

In example 30 the determination apparatus 10 of any of the previous examples comprises a plurality of sensors generating a plurality of coverage regions and the means for controlling 14 is configured for determining the spatial transmission or reception mode by selecting or weighting one or more transmission or reception beams from a plurality of antenna beams.

In example 31 the means for controlling 14 of any of the previous examples is configured for controlling a plurality of antennas of the mobile transceiver and for generating the plurality of antenna beams.

In example 32 the plurality of antenna beams is a grid of antenna beams and the plurality of coverage regions is a grid of coverage regions, and the grid of antenna beams is collocated with the grid of coverage regions.

In example 33 the plurality of antenna beams is a grid of antenna beams and the plurality of coverage regions is a grid of coverage regions, and the grid of beams differs from the grid of coverage regions, and the means for controlling 14 of any of the previous examples is configured for determining the transmission or reception mode by interpolating between coverage regions of the grid of coverage regions based on a mapping to the grid of antenna beams, or determining the transmission or reception mode by interpolating between beams of the grid of antenna beams based on a mapping to the grid of coverage regions.

In example 34 the means for controlling 14 of any of the previous examples is configured for selecting one or more beams for transmission or reception based on a beam specific metric, and for determining the beam specific metric for at least a subset of the grid of beams based on the attenuating object information for at least a subset of the grid of coverage regions. The metric is determined in a way that the higher a likelihood of an attenuating object being located in a beam direction the lower the likelihood for said beam to be selected for transmission or reception.

Example 35 is a mobile transceiver 100 comprising an example of the determination circuit 10 of any of the previous examples or comprising an example of the determination apparatus 10 of any of the previous examples.

Example 36 is a method for determining a spatial transmission or reception mode for a mobile transceiver. The method comprises sensing 72 attenuating object information. The method comprises determining 74 the spatial transmission or reception mode based on the sensed attenuating object information. The method comprises controlling 76 the spatial transmission or reception mode of the mobile transceiver 100.

In example 37 the method of one of the previous examples comprises controlling a plurality of antennas of the mobile transceiver 100.

In example 38 the method of one of the previous examples comprises selecting or determining weight information for one or more antennas from the plurality of antennas based on the sensed attenuating object information, and the spatial transmission or reception mode corresponds to using the one or more selected antennas for transmission or reception.

In example 39 the method of one of the previous examples comprises controlling a plurality of antenna beams, and selecting or determining weight information for one or more antenna beams from the plurality of antenna beams based on the sensed attenuating object information and the spatial transmission or reception mode corresponds to the one or more selected antenna beams.

In example 40 the method of one of the previous examples comprises detecting information of one or more attenuating objects.

In example 41 in the method of one of the previous examples the spatial transmission or reception mode is a spatial direction for transmission or reception, or one or more locations comprised in or on a mobile device comprising the mobile transceiver 100 for transmission or reception.

In example 42 the method of one of the previous examples comprises sensing using a touch, a directional touch, a proximity or a directional proximity sensor for detecting a radio frequency blocker or a direction of a radio frequency blocker.

In example 43 the method of one of the previous examples comprises carrying out beamforming or beam selection based on a subset of antennas or beams determined based on the spatial transmission or reception mode.

In example 44 the method of one of the previous examples comprises sensing proximity or direction of a human body.

In example 45 the method of one of the previous examples comprises determining the transmission or reception mode to reduce a radio frequency exposure for the human body.

In example 46 in the method of one of the previous examples the attenuating object information is information on a reflection coefficient at an antenna or a standing wave ratio of an antenna.

In example 47 the method of one of the previous examples comprises sensing using at least one element of the group of an inductive sensor, a photoelectric sensor, an optical sensor, a passive infrared sensor, a capacitive sensor, a resistive sensor, and a piezoelectric sensor.

In example 48 the method of one of the previous examples comprises generating a plurality of coverage regions using a plurality of sensors and determining the spatial transmission or reception mode by selecting or weighting one or more transmission or reception beams from a plurality of antenna beams.

In example 49 the method of one of the previous examples comprises controlling a plurality of antennas of the mobile transceiver 100 and generating the plurality of antenna beams.

In example 50 in the method of one of the previous examples the plurality of antenna beams is a grid of antenna beams and the plurality of coverage regions is a grid of coverage regions, and the grid of antenna beams is collocated with the grid of coverage regions.

In example 51 the method of one of the previous examples the plurality of antenna beams is a grid of antenna beams and the plurality of coverage regions is a grid of coverage regions, and the grid of beams differs from the grid of coverage regions. The method comprises determining the transmission or reception mode by interpolating between coverage regions of the grid of coverage regions based on a mapping to the grid of antenna beams, or determining the transmission or reception mode by interpolating between beams of the grid of antenna beams based on a mapping to the grid of coverage regions.

In example 52 the method of one of the previous examples comprises selecting one or more beams for transmission or reception based on a beam specific metric, and determining the beam specific metric for at least a subset of the grid of beams based on attenuating object information for at least a subset of the grid of coverage regions. The metric is determined in a way that the higher a likelihood of an attenuating object being located in a beam direction the lower the likelihood for said beam to be selected for transmission or reception.

Example 53 is a computer program having a program code for performing the method of at least one of the previous examples, when the computer program is executed on a computer, a processor, or a programmable hardware component.

Example 54 is a machine readable storage including machine readable instructions, when executed, to implement a method or realize an apparatus as claimed in any pending claim.

Example 55 is a machine readable medium including code, when executed, to cause a machine to perform a method of one of the previous examples.

Example 56 is a communication device with a transceiver, and comprising the determination circuit 10 of one of the examples 1 to 17 or the determination apparatus 10 of one of the examples 18 to 34.

A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, exemplify the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th." A means configured to perform a certain function does, hence, not imply that such means necessarily is performing the function (at a given time instant).

Functions of various elements shown in the figures, including any functional blocks labeled as "means", "means for sensing", "means for determining", "means for controlling", etc., may be provided through the use of dedicated hardware, such as "a sensor", "a determiner", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry exemplify the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

The invention claimed is:

1. A determination circuit configured to determine a spatial transmission or reception mode for a mobile transceiver, the determination circuit comprising;
  at least one sensor configured to sense attenuating object information;
  a control module configured to
    determine the spatial transmission or reception mode based on the sensed attenuating object information,
    control the spatial transmission or reception mode of the mobile transceiver; and
    select an antenna beam among a set of candidate antenna beams through beam training,
  wherein each of a plurality of antenna beams is associated with a weight and the control module is configured to reduce, if a blocker is detected by a sensor, the weight of an antenna beam overlapping with a direction of the blocker, and select the set of candidate antenna beams in a decreasing order of weights,
  wherein the spatial transmission or reception mode corresponds to the selected antenna beam.

2. The determination circuit of claim 1, wherein the control module is configured to control a plurality of antennas of the mobile transceiver.

3. The determination circuit of claim 1, comprising a plurality of sensors configured to detect information of one or more attenuating objects.

4. The determination circuit of claim 3, wherein the spatial transmission or reception mode is a spatial direction for transmission or reception, or one or more locations comprised in or on a mobile device comprising the mobile transceiver for transmission or reception.

5. The determination circuit of claim 1, wherein the sensor is a touch, a directional touch, a proximity or a directional proximity sensor to detect a radio frequency blocker or a direction of a radio frequency blocker.

6. The determination circuit of claim 1, wherein the sensor is configured to sense proximity or direction of a human body.

7. The determination circuit of claim 6, wherein the control module is configured to determine the transmission or reception mode to reduce a radio frequency exposure for the human body.

8. The determination circuit of claim 7, wherein the sensor is an antenna and wherein the attenuating object information is information on a reflection coefficient at the antenna or a standing wave ratio of the antenna.

9. The determination circuit of claim 1, wherein the sensor comprises at least one element of the group of an inductive sensor, a photoelectric sensor, an optical sensor, a passive infrared sensor, a capacitive sensor, a resistive sensor, and a piezoelectric sensor.

10. The determination circuit of claim 1, comprising a plurality of sensors generating a plurality of sensor coverage regions and wherein the control module is configured to determine the spatial transmission or reception mode by selecting or weighting one or more transmission or reception beams from a plurality of antenna beams.

11. The determination circuit of claim 10, wherein the control module is configured to control a plurality of antennas of the mobile transceiver and to generate the plurality of antenna beams.

12. The determination circuit of claim 11, wherein the plurality of antenna beams is a grid of antenna beams and wherein the plurality of sensor coverage regions is a grid of sensor coverage regions, and wherein the grid of antenna beams is collocated with the grid of sensor coverage regions.

13. The determination circuit of claim 11, wherein the plurality of antenna beams is a grid of antenna beams and wherein the plurality of sensor coverage regions is a grid of sensor coverage regions, wherein the grid of beams differs from the grid of sensor coverage regions, and wherein the control module is configured to determine the transmission or reception mode by interpolating between sensor coverage regions of the grid of sensor coverage regions based on a mapping to the grid of antenna beams, or determine the transmission or reception mode by interpolating between beams of the grid of antenna beams based on a mapping to the grid of sensor coverage regions.

14. The determination circuit of claim 13, wherein the control module is configured to select one or more beams for transmission or reception based on a beam specific metric, and determine the beam specific metric for at least a subset of the grid of beams based on the attenuating object information for at least a subset of the grid of sensor coverage regions, where the metric is determined in a way that the higher a likelihood of an attenuating object being located in a beam direction the lower the likelihood for said beam to be selected for transmission or reception.

15. A mobile transceiver comprising the determination circuit of claim 1.

16. A communication device with a transceiver, and comprising the determination circuit of claim 1.

17. A method for determining a spatial transmission or reception mode for a mobile transceiver, the method comprising sensing attenuating object information;

determining the spatial transmission or reception mode based on the sensed attenuating object information;

controlling the spatial transmission or reception mode of the mobile transceiver; and selecting an antenna beam among a set of candidate antenna beams through beam training, wherein each of a plurality of antenna beams is associated with a weight, and if a blocker is detected by a sensor, the weight of an antenna beam overlapping with a direction of the blocker is reduced, and the set of candidate antenna beams is selected in a decreasing order of weights, wherein the spatial transmission or reception mode corresponds to the selected antenna beam.

18. The method of claim 17, comprising controlling a plurality of antennas of the mobile transceiver.

19. The method of claim 18, comprising selecting or determining weight information for one or more antennas from the plurality of antennas based on the sensed attenuating object information, and wherein the spatial transmission or reception mode corresponds to using the one or more selected antennas for transmission or reception.

20. A non-transitory machine-readable storage including machine-readable instructions, when executed, to implement a method of claim 17.

* * * * *